US007644217B2

(12) United States Patent
Butler et al.

(10) Patent No.: US 7,644,217 B2
(45) Date of Patent: Jan. 5, 2010

(54) DETECTING CONNECTION TO A USB HOST OR HUB WITHOUT USING AN EXTRA STATUS INPUT

(75) Inventors: Daniel Butler, Chandler, AZ (US); Hartono Darmawaskita, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 176 days.

(21) Appl. No.: 11/681,253

(22) Filed: Mar. 2, 2007

(65) Prior Publication Data

US 2008/0215765 A1 Sep. 4, 2008

(51) Int. Cl.
G06F 13/00 (2006.01)
G06F 13/42 (2006.01)
H03K 17/16 (2006.01)
G06F 13/14 (2006.01)

(52) U.S. Cl. .................. 710/302; 710/106; 710/305; 710/15; 326/30; 326/86; 326/90

(58) Field of Classification Search .................. None
See application file for complete search history.

(56) References Cited

U.S. PATENT DOCUMENTS 6,593,768 B1 * 7/2003 Iyer et al. .................. 326/30

| | | | |
|---|---|---|---|
| 7,177,969 B2 * | 2/2007 | Croyle | 710/305 |
| 7,512,825 B2 * | 3/2009 | Winick et al. | 713/340 |
| 2002/0169915 A1 * | 11/2002 | Wu | 710/305 |
| 2007/0106825 A1 * | 5/2007 | Duval et al. | 710/106 |

FOREIGN PATENT DOCUMENTS

EP 1758029 A1 2/2007

OTHER PUBLICATIONS

Universal Serial Bus Specification 2.0 (Chapter 7), Apr. 27, 2000, pp. 119-194, XP002348936.
International Search Report and Written Opinion for PCT/US2008/055273 mailed Jul. 1, 2008.

* cited by examiner

*Primary Examiner*—Mark Rinehart
*Assistant Examiner*—Brian T Misiura
(74) *Attorney, Agent, or Firm*—King & Spalding L.L.P.

(57) ABSTRACT

A low power Universal Serial Bus (USB) capable device uses a weak pull-up resistance that is coupled to at least one data line of the USB for detection of when the USB capable device is connected to a USB host or hub. When the USB capable device is not connected to the USB host or hub, USB peripheral, including the USB transceiver, USB voltage regulator, serial interface and/or USB logic circuits required for USB operation may be powered down to conserve power drawn by the USB capable device. When the USB capable device is connected to the USB host or hub, a voltage from the weak pull-up will be significantly reduced, thus signaling that the USB peripheral and associated circuits should be powered up for normal USB operation.

17 Claims, 3 Drawing Sheets

FIGURE 1 (Prior Technology)

DETECTING CONNECTION TO A USB HOST OR HUB WITHOUT USING AN EXTRA STATUS INPUT

TECHNICAL FIELD

The present disclosure relates to Universal Serial Bus (USB) capable devices, and more particularly, to a way of detecting when a USB capable device is connected to a USB host or hub without having to use an extra status input at the USB capable device.

BACKGROUND

The Universal Serial Bus (USB) is an industry standard bus that may be used for coupling digital data between a USB host or hub, and a USB capable device. In addition, the USB host or hub may supply power to the USB capable device. Some USB capable devices may operate either attached to or detached from the USB Bus. For power saving, especially in battery powered USB capable devices, it's preferable to keep the USB peripheral (e.g., USB transceiver, serial interface engine, voltage regulator, support circuits, etc.), located in the USB capable device powered down when not attached to the USB host or hub. Then detect when the USB capable device is coupled to the USB host or hub, and activate the USB peripheral at that time. Existing methods of doing this use an extra status input, e.g., input-output (I/O) connection of the USB capable device, to detect when power is available from the USB host or hub, thus indicating a connection to the USB host or hub. Referring to FIG. 1, depicted is a prior technology way of detecting a USB connection between a USB host or hub 106, and a USB capable device 102. The USB host or hub 106 comprises a USB peripheral 108, and the USB capable device 102 comprises a USB peripheral 104. When the USB cable 220 is plugged into the USB host or hub 106 and the USB capable device 102, the D+ and D− data lines 116 and 114 are coupled therebetween, Bust power (+5 v) 110 and ground 118 from the USB host or hub 102 are coupled to and power the USB capable device 102. A dedicated status input 112 of the USB capable device 102 may be coupled to the Vbus power 110 through a resistor 120. A voltage at the status input 112 indicates that the USB capable device 102 is coupled to the USB host or hub 106. The USB cable 220 is optional since some USB capable devices 102 may plug directly into a USB port at the USB host or hub 106.

SUMMARY

What is needed is a way to detect when a USB capable device is coupled to a USB host or hub without requiring the use of an extra dedicated status input, e.g., I/O connection at the USB capable device. According to teachings of this disclosure, adding very weak resistive pull-ups, e.g., 150,000 ohms, to the D+ and/or D− USB data lines of the USB peripheral located in the USB capable device will hold these data lines at substantially a positive supply voltage, Vdd, until the USB capable device is coupled to the USB host or hub USB port via a USB cable or direct connection. The USB host or hub has resistive pull-downs, e.g., 15,000 ohms, coupled to the D+ and D− USB data lines whereby when the USB capable device is coupled to the USB host or hub, these resistive pull-downs will lower the voltage at the D+ and the D− data lines to about 10 percent of the positive supply voltage, Vdd. The USB capable device USB peripheral may be powered down state to conserve power required by the USB capable device, e.g., USB transceiver, serial interface engine, voltage regulator, support circuits, etc., draw substantially no power. When the voltage on either or both of the D+ and D− USB data lines changes from substantially Vdd to about 10 percent of Vdd, a signal, e.g., interrupt, may be generated to tell the USB capable device to power up its USB peripheral so that normal USB communications may take place between the USB capable device and the USB host or hub.

According to a specific example embodiment of this disclosure, a Universal Serial Bus (USB) capable device having a power saving feature may comprise: a USB peripheral comprising a USB transceiver having USB data lines, a USB voltage regulator, a serial interface and USB logic; a strong pull-up resistor coupled to a one of the USB data lines and the USB voltage regulator; and a weak pull-up resistor coupled to the one of the USB data lines and a power supply voltage; wherein when the one of the USB data lines is at substantially the power supply voltage, the USB peripheral is inactive and draws minimal power, and when the one of the USB data lines is at substantially a power supply common a USB detection signal is generated to activate the USB peripheral. Another weak pull-up resistor coupled to an other one of the USB data lines and the power supply voltage, wherein when the other one of the USB data lines is at substantially the power supply voltage, the USB peripheral is inactive and draws minimal power, and when the other one of the USB data lines is at substantially the power supply common the USB detection signal is generated to activate the USB peripheral.

According to another specific example embodiment of this disclosure, a method for conserving power in a Universal Serial Bus (USB) capable device may comprise the steps of: providing a USB peripheral comprising a USB transceiver having USB data lines, a USB voltage regulator, a serial interface and USB logic; providing a strong pull-up resistor between a one of the USB data lines and the USB voltage regulator; and providing a weak pull-up resistor between the one of the USB data lines and a power supply voltage; and placing the USB voltage regulator inactive when the one of the USB data lines is at substantially the power supply voltage or placing the USB voltage regulator active when the one of the USB data lines is at substantially the power supply common. The method may further comprise the step of powering down the USB transceiver when the one of the USB data lines is at substantially the power supply voltage or powering up the USB transceiver active when the one of the USB data lines is at substantially the power supply common. The method may further comprise the steps of providing another weak pull-up resistor between an other one of the USB data lines and the power supply voltage; and placing the USB peripheral inactive when either or both of the one and the other one of the USB data lines are at substantially the power supply voltage or placing the USB peripheral active when both the one and the other one of the USB data lines are at substantially the power supply common.

BRIEF DESCRIPTION OF THE DRAWINGS

A more complete understanding of the present disclosure thereof may be acquired by referring to the following description taken in conjunction with the accompanying drawings wherein.

Figure 1:
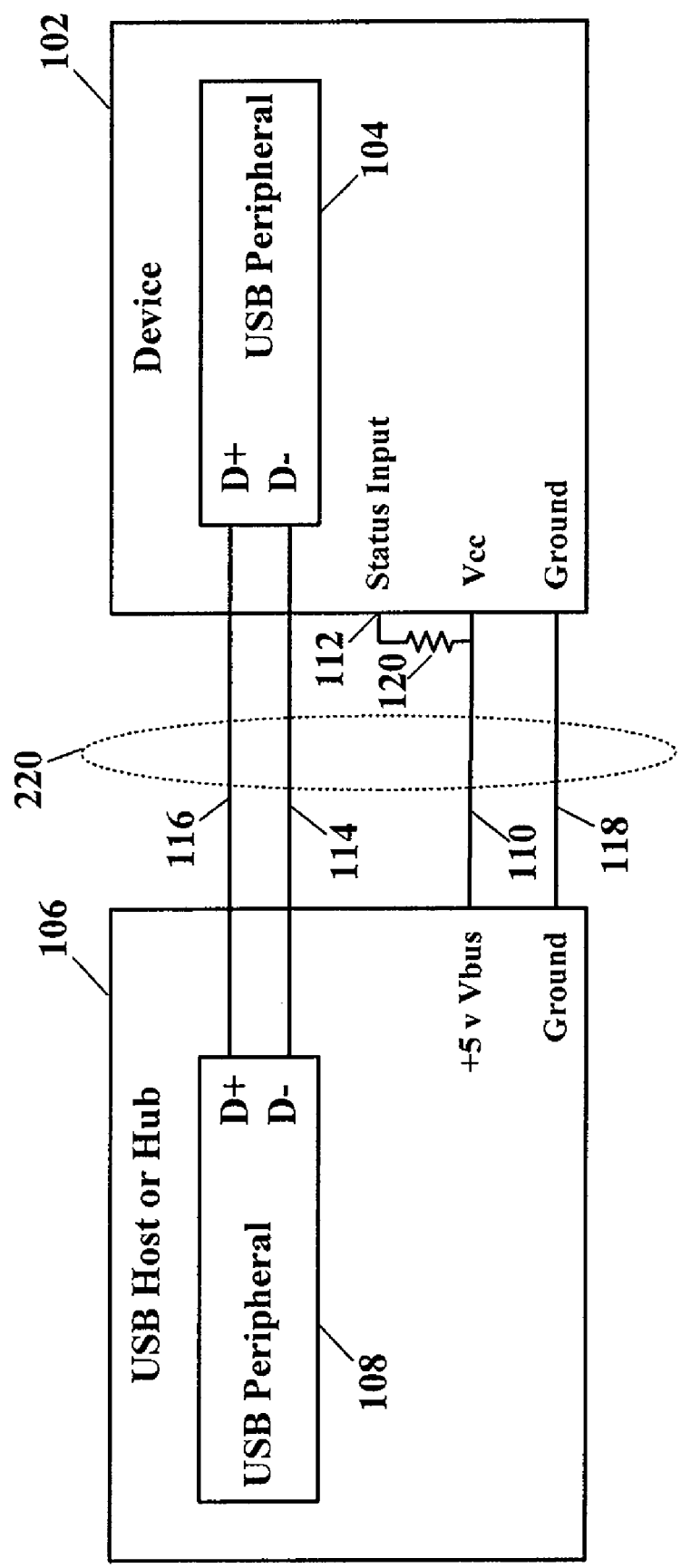
FIG. 1 is a schematic block diagram of a prior technology USB capable device coupled to a USB host or hub and using a status input to determine when connected to the USB host or hub.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of example embodiments are schematically illustrated. Like elements in the drawings will be represented by like numbers, and similar elements will be represented by like numbers with a different lower case letter suffix.

Figure 2:
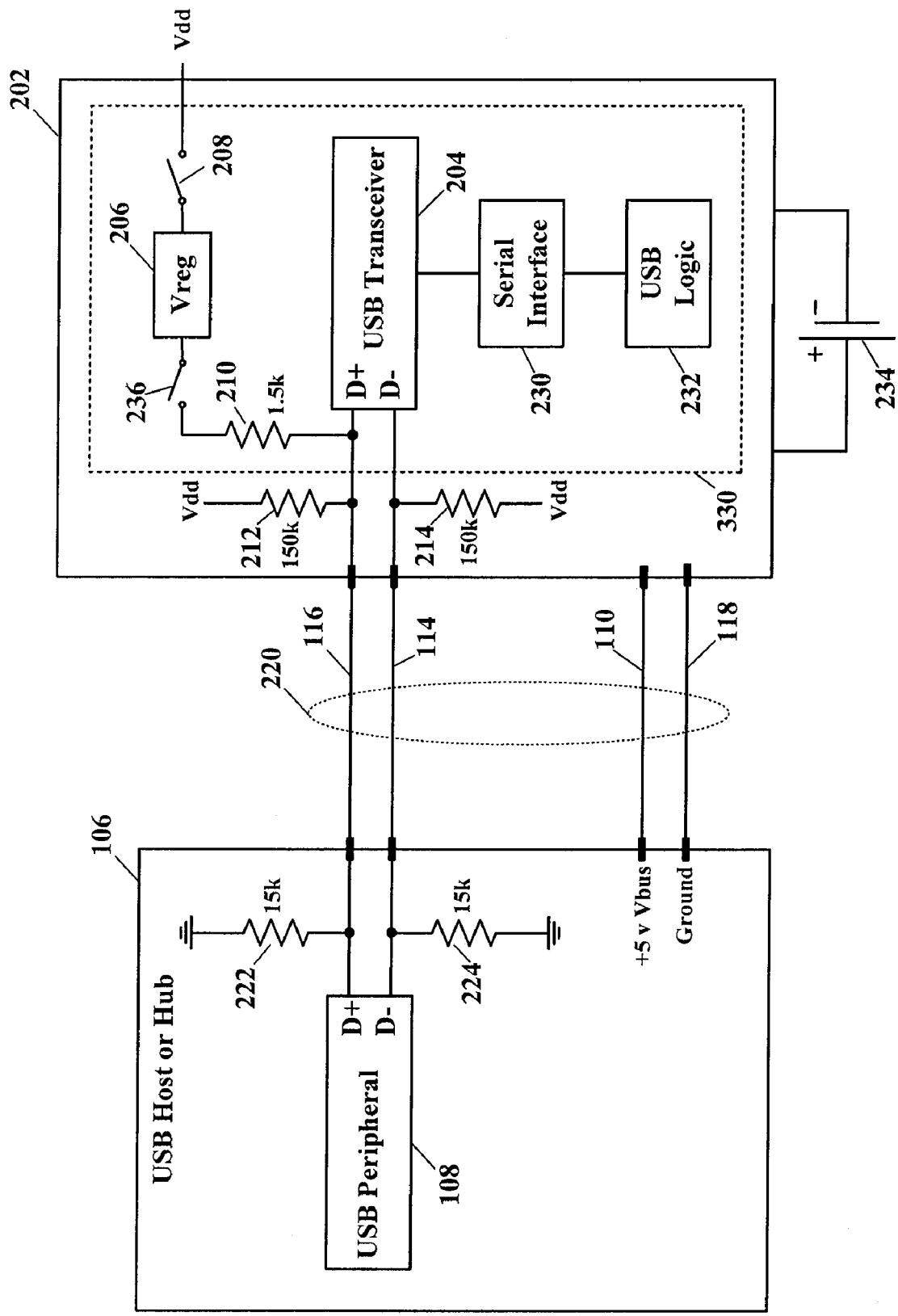
FIG. 2 is a schematic block diagram of a USB capable device coupled to a USB host or hub and having connection detection circuits for determining when connected to the USB host or hub, according to a specific example embodiment of this disclosure.

Referring to FIG. 2, depicted is a schematic block diagram of a USB capable device coupled to a USB host or hub and having connection detection circuits for determining when connected to the USB host or hub, according to a specific example embodiment of this disclosure. The USB capable device 202 may include a USB peripheral 330 that may be comprised of a USB transceiver 204, a USB voltage regulator 206, a serial interface 230 and USB logic 232 that may be coupled to digital circuits (not shown), e.g., central processing unit (CPU), of the USB capable device 202. The USB transceiver 204 has D+ and D− USB data lines 116 and 114, respectively, according to the USB specifications more fully described at www.USB.org and incorporated by reference herein. A weak resistive pull-up, e.g., about 150,000 ohms, resistor 212 and/or resistor 214 may be coupled to the D+ and/or D− data lines 116 and 114, respectively, and Vdd. When the USB capable device 202 is not coupled to a USB host or hub 106, its D+ and D− data lines are only coupled to the resistor 212 and/or the resistor 214, respectively. Therefore the D+ and D− data lines 116 and 114, respectively, may be at a voltage substantially equal to Vdd. The USB voltage regulator 206 may be disabled (decoupled from Vdd) by opening switch 208, and the D+ data line 116 may be decoupled from the USB voltage regulator 206 by opening switch 236. The switch 208 may be integral with the USB voltage regulator 206, and the switches 208 and 236 may be independently controllable by a user, e.g., through program commands to the USB capable device 202. However, what is significant is that the strong pull-up resistor 210 is not supplying voltage from the USB voltage regulator 206 to the D+ data line 116. Also the additional circuits of the USB peripheral 330, e.g., USB transceiver 204, serial interface 230 and/or the USB logic 232 may be disabled for additional savings in power when the USB capable device 202 is powered from a battery 234.

When the USB capable device 202 is coupled to a USB port of the USB host or hub 106 through a USB cable 220 or directly thereto (without the cable 220), resistor 222 and resistor 224 may be coupled to the D+ and D− data lines, respectively, in accordance with the USB specification. Since the resistors 222 and 224 are much stronger pull-downs then are the resistor 212 and/or resistor 214 as pull-ups, the voltage at the D+ and/or D− data lines 116 and 114, respectively, will change significantly, e.g., the voltage will drop about 90 percent for the specific example embodiment shown in FIG. 2. This voltage change is more than enough to indicate that the USB capable device 202 has been coupled to a USB port of the USB host or hub 106.

It is contemplated and within the scope of this disclosure that either or both of the D+ and D− data lines 116 and 114, respectively, may be used to monitor the USB capable device 202 connection to or removal from the USB host or hub 106. However, using such a weak pull-up resistance (resistor 212 and/or 214) may leave the connection signal from the D+ or D− line susceptible to accidental triggering by noise. Thus it may be beneficial to utilize similar pull-up resistors 212 and 214 on both D+ and D− data lines, respectively, with the USB wake-up circuits triggered by, for example but not limited to, a logical NAND of both the D+ and D− data lines (see FIG. 3).

Figure 3:
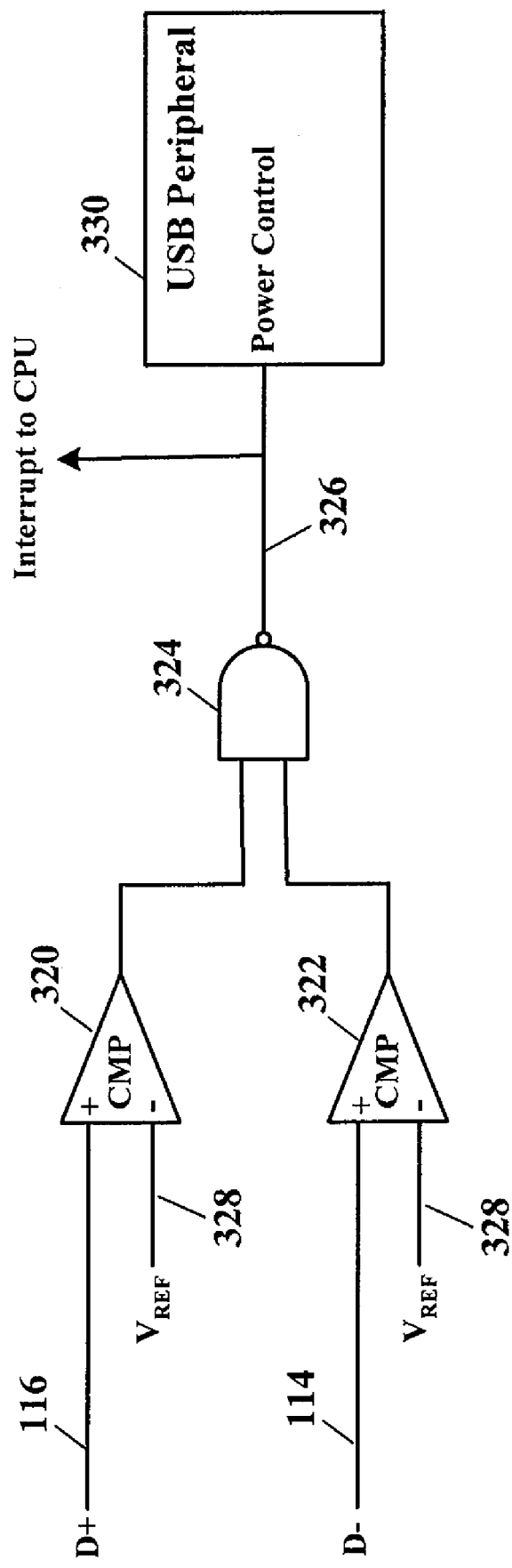
FIG. 3 is a schematic logic diagram of a connection detector circuit for determining when the USB capable device is connected to the USB host or hub, according to the specific example embodiment shown in FIG. 2.

Referring to FIG. 3, depicted is a schematic logic diagram of a connection detector circuit for determining when the USB capable device is connected to the USB host or hub, according to the specific example embodiment shown in FIG. 2. Low power voltage comparators 320 and 322 may monitor the voltages on the D+ and D− data lines 116 and 114, respectively. Whenever the voltage on one or both of the D+ and D− data lines 116 and 114, respectively, drops below a reference voltage 328, a NAND gate 324 output 326 may change logic states, e.g., low to high, and may cause the USB peripheral 330 to become active. This may occur as an interrupt to the processor (not shown) of the USB capable device 202.

The USB capable device 202 USB peripheral 330 may be in a powered down state to conserve power required by the USB capable device 202, e.g., when operating from the battery 234 and not coupled to the USB host or hub 106. When the voltage on either or both of the D+ and D− USB data lines 116 and/or 114, respectively, changes from substantially Vdd to about 10 percent of Vdd, a signal, e.g., interrupt, may be generated to tell the USB capable device 202 to power up its USB peripheral 330 so that normal USB communications may take place between the USB capable device 202 and the USB host or hub 106.

When either or both of the D+ and the D− data lines 116 and 114, respectively, are at about 0.10×Vdd (e.g., USB capable device 202 connected to USB host or hub 106), low power comparator circuits 320 may detect this and have a logical output 326 that transitions from a first logic level to a second logic level, e.g., logic "1" to logic "0." This logic level transition may initiate an interrupt to the USB capable device 202 thereby telling the USB capable device 202 to turn on the USB peripheral 330 power consuming circuits required for USB communications between the USB capable device 202 and the USB host or hub 106.

Once the USB voltage regulator 206 turns on, e.g., is connected to Vdd, its regulated output voltage, e.g., 3.3 volts, may be coupled to the D+ data line 116 through a strong pull-up resistor 212, e.g., about 1,500 ohms, thus forcing the D+ data line 116 back to substantially 90 percent of the USB voltage regulator 206 output voltage. An upstream USB host or hub 106 will thereby detect that a USB capable device 202 is connected by seeing the voltage on the D+ data line 116 rising due to the strong pull-up resistor 210 connected to the USB voltage regulator 206. On a USB capable device 202 that spends most of its time disconnected from a USB host and thereby runs on battery power, power may be saved by not powering up the USB peripheral interface and the USB voltage regulator 206 until the USB capable device 202 is plugged in to the USB host or hub 106. Powering up the USB voltage regulator 206 may also make the contribution of the weak pull-up resistance (resistors 212 and/or 214) insignificant, because the resistors 212 and 214 are of such a large value of resistance compared to the USB resistors 222, 224 and 210 that data transmission degradation would be insignificant if at all.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. Universal Serial Bus (USB) capable device having power saving features, comprising:
    a USB peripheral comprising a USB transceiver having USB data lines, a USB voltage regulator, a serial interface and USB logic, wherein the USB voltage regulator is switchably coupled to a power supply voltage;
    a strong pull-up resistor coupled to a one of the USB data lines and switchably coupled to the USB voltage regulator; and
    a weak pull-up resistor coupled to the one of the USB data lines and the power supply voltage;
    wherein when voltage on the one of the USB data lines is greater than a reference voltage, the USB peripheral is inactive, the strong pull-up resistor is disconnected from the USB voltage regulator and the USB voltage regulator is disconnected from the power supply voltage, whereby the USB peripheral draws minimal power, and when the voltage on the one of the USB data lines is less than the reference voltage a USB detection signal is generated to activate the USB peripheral, thereby connecting the strong pull-up resistor to the USB voltage regulator and connecting the USB voltage regulator to the power supply voltage.

2. The USB capable device according to claim 1, further comprising another weak pull-up resistor coupled to an other one of the USB data lines and the power supply voltage, wherein when voltage on the other one of the USB data lines is greater than the reference voltage, the USB peripheral is inactive and draws minimal power, and when the voltage on the other one of the USB data lines is less than the reference voltage the USB detection signal is generated to activate the USB peripheral.

3. The USB capable device according to claim 1, wherein the weak pull-up resistor has a resistance value of about 100 times the resistance value of the strong pull-up resistor, wherein the strong pull-up resistor is about 1500 ohms.

4. The USB capable device according to claim 1, wherein a voltage comparator determines when the voltage on the one of the USB data lines is greater than the reference voltage or less than the reference voltage.

5. The USB capable device according to claim 2, wherein a first voltage comparator determines when the voltage on the one of the USB data lines is greater than the reference voltage or less than the reference voltage, and a second voltage comparator determines when the voltage on the other one of the USB data lines is greater than the reference voltage or less than the reference voltage.

6. The USB capable device according to claim 5, wherein the USB peripheral is inactive and draws minimal power until the voltages on the one and the other one of the USB data lines are less than the reference voltage.

7. The USB capable device according to claim 1, further comprising a USB host coupled to the USB interface, wherein when the USB host is coupled to the USB peripheral the one of the USB data lines is less than the reference voltage until the USB voltage regulator becomes active.

8. The USB capable device according to claim 1, further comprising a USB hub coupled to the USB interface, wherein when the USB hub is coupled to the USB peripheral the one of the USB data lines is less than the reference voltage until the USB voltage regulator becomes active.

9. A method for conserving power in a Universal Serial Bus (USB) capable device, said method comprising the steps of:
    providing a USB peripheral comprising a USB transceiver having USB data lines, a USB voltage regulator, a serial interface and USB logic, wherein the USB voltage regulator is switchably coupled to a power supply voltage;
    providing a strong pull-up resistor between a one of the USB data lines and the USB voltage regulator, wherein the strong pull-up resistor is switchably coupled to the USB voltage regulator; and
    providing a weak pull-up resistor between the one of the USB data lines and a power supply voltage;
    deactivating the USB peripheral when voltage on the one of the USB data lines is greater than a reference voltage, wherein the strong pull-up resistor is disconnected from the USB voltage regulator and the USB voltage regulator is disconnected from the power supply voltage, whereby the USB peripheral draws minimal power; and
    activating the USB peripheral when the voltage on the one of the USB data lines is less than the reference voltage, whereby the strong pull-up resistor is connected to the USB voltage regulator and the USB voltage regulator is connected to the power supply voltage.

10. The method according to claim 9, further comprising the steps of:
    providing another weak pull-up resistor between an other one of the USB data lines and the power supply voltage; and
    placing the USB peripheral inactive when the voltages on either or both of the one and the other one of the USB data lines are greater than the reference voltage or placing the USB peripheral active when the voltages on both the one and the other one of the USB data lines are less than the reference voltage.

11. The method according to claim 10, further comprising the steps of:
    generating an interrupt when voltages on the one and the other one of the USB data lines are both less than the reference voltage; and
    activating the USB peripheral from the generated interrupt.

12. The method according to claim 9, further comprising the step of providing a voltage comparator for determining when the voltage on the one of the USB data lines is greater than the reference voltage or less than the reference voltage.

13. The method according to claim 11, further comprising the steps of:
    providing a first voltage comparator for determining when the voltage on the one of the USB data lines is greater than the reference voltage or less than the reference voltage; and
    providing a second voltage comparator for determining when the voltage on the other one of the USB data lines is greater than the reference voltage or less than the reference voltage.

14. The method according to claim 9, further comprising the step of coupling a USB host to the USB interface, wherein when the USB host is coupled to the USB interface the voltage on the one of the USB data lines is less than the reference voltage until the USB voltage regulator becomes active.

15. The method according to claim 9, further comprising the step of coupling a USB hub to the USB interface, wherein when the USB hub is coupled to the USB interface the voltage on the other one of the USB data lines is less than the reference voltage until the USB voltage regulator becomes active.

16. The USB capable device according to claim 1, wherein the reference voltage is from ten (10) percent to ninety (90) percent of the power supply voltage.

17. The method according to claim 9, wherein the reference voltage is from ten (10) percent to ninety (90) percent of the power supply voltage.

* * * * *